(12) United States Patent
Minagawa et al.

(10) Patent No.: US 8,374,251 B2
(45) Date of Patent: Feb. 12, 2013

(54) VIDEO DECODER SYSTEM FOR MOVABLE APPLICATION

(75) Inventors: Yusuke Minagawa, Kawasaki (JP); Satoru Yamauchi, Seongnam-si (KR)

(73) Assignee: Texas Instruments Incorporated, Dallas, TX (US)

( * ) Notice: Subject to any disclaimer, the term of this patent is extended or adjusted under 35 U.S.C. 154(b) by 581 days.

(21) Appl. No.: 12/618,328

(22) Filed: Nov. 13, 2009

(65) Prior Publication Data
US 2010/0171885 A1    Jul. 8, 2010

Related U.S. Application Data

(60) Provisional application No. 61/114,236, filed on Nov. 13, 2008.

(51) Int. Cl.
*H04B 1/66* (2006.01)
*H04N 9/74* (2006.01)
(52) U.S. Cl. .................. 375/240.25; 348/581
(58) Field of Classification Search ............ 348/731, 348/476, 568, 581, 441, 443, 445; 382/298, 382/293; 375/240.01–240.26; 725/139, 131, 80, 100
See application file for complete search history.

(56) References Cited

U.S. PATENT DOCUMENTS

| 6,377,309 B1* | 4/2002 | Ito et al. ..................... 348/554 |
| 2004/0136406 A1* | 7/2004 | Kuramoto ..................... 370/503 |
| 2004/0228609 A1* | 11/2004 | Nakamura ..................... 386/46 |
| 2004/0258396 A1* | 12/2004 | Nakamura et al. ............. 386/83 |
| 2006/0282874 A1* | 12/2006 | Ito et al. ..................... 725/139 |
| 2007/0067820 A1* | 3/2007 | Cha ............................. 725/151 |
| 2007/0133943 A1* | 6/2007 | Muguruma et al. ........... 386/83 |

\* cited by examiner

*Primary Examiner* — Behrooz Senfi
(74) *Attorney, Agent, or Firm* — Robert D. Marshall, Jr.; Wade James Brady, III; Frederick J. Telecky, Jr.

(57) ABSTRACT

This invention is a digital television receiver receiving alternative broadcasts. Separate tuners receive separate broadcast signals, such as 12-segment HDTV and 1-segment QVGA. A multiplexer selects one tuner based upon receiver status of a first tuner. The selected signal is decoded and resized for a display. The decoder uses a frame buffer of images in the resized size. In the preferred embodiment the input signals are a 12-segment HDTV broadcast and a 1-segment QVGA broadcast and the resized size is VGA.

6 Claims, 3 Drawing Sheets

VIDEO DECODER SYSTEM FOR MOVABLE APPLICATION

CLAIM OF PRIORITY

This application claims priority under 35 U.S.C. 119(e)(1) to U.S. Provisional Application No. 61/114,236 filed Nov. 13, 2008.

TECHNICAL FIELD OF THE INVENTION

The technical field of this invention is a method for video decoder system with plural tuners used in movable applications such as a car navigation system or mobile PC or phone.

BACKGROUND OF THE INVENTION

The decoder system of digital TV broadcast receiver used on a movable platform, such as a car navigation system, requires a tuner and Motion Picture Expert's Group (MPEG) decoder pair for each bitstream of HDTV (12-segment) and QVGA (1-segment), independently. This requirement remains even though only one of inputs is selected as source of displayed images. Providing two such tuner/MPEG decoder pairs consumes a disadvantageous amount of electric power and makes the decoder system large.

It is feasible in the current art to watch digital TV broadcast programs on movable platforms such as commercial car navigation systems, mobile PCs or mobile phones. In car navigation systems watching HDTV (12-segment) broadcasting of VGA sized display is feasible. While watching TV on such a car navigation system, motion of the car changes the received TV signal. Sometimes the TV receiver can no longer receive the TV signal correctly. For example, the receiver may not be able to receive the TV signal correctly near mountains or within tunnels.

In such case, the receiver stops decoding the HDTV (12-segment) broadcast and switches to decoding the QVGA (1-segment) broadcast. Contents of both transmissions are the same. However, the mass of information (such as image size, sound quality, frame rate and etc) are much differently coded.

FIG. 1 illustrates a block diagram of this prior art receiver 100. First antenna 111 receives the 12-segment HDTV broadcast and supplies the received signal to tuner 112. Tuner 112 detects the HDTV broadcast signal and supplies a bitstream to first MPEG decoder 113. Tuner 112 also produces a receiver status signal 114. Receiver status signal 114 is a digital signal indicating the receiver status as good or bad. MPEG decoder 113 employs a number of frame buffers 115. These are preferably stored in synchronous dynamic random access memory (SDRAM). As known in the art MPEG decoding often includes differential coding from a prior frame or a following frame requiring storing data for decoding. MPEG decoder 113 generates decoded HDTV images supplied to a first input of multiplexer 120. These HDTV images are used as references for other decoding. FIG. 1 illustrates a connection from the decoded image output of MPEG decoder 113 to frame buffers 115. This provides a path for decoded HDTV images to be stored in frame buffers 115. MPEG decoder 113 uses the image data stored in frame buffers 115 in decoding. Note that frame buffers 115 store HDTV size images.

Second antenna 131 receives the 1-segment QVGA broadcast and supplies the received signal to tuner 132. Tuner 132 detects the QVGA broadcast signal and supplies a bitstream to second MPEG decoder 113. MPEG decoder 133 employs a number of frame buffers 134. These are preferably stored in SDRAM. MPEG decoder 133 generates decoded QVGA images supplied to a second input of multiplexer 120. FIG. 1 illustrates a connection from the decoded image output of MPEG decoder 133 to frame buffers 134. This provides a path for decoded QVGA images to be stored in frame buffers 134. MPEG decoder 133 uses the image data stored in frame buffers 134 in decoding. Note that frame buffers 134 store QVGA sized images.

Multiplexer 120 selects between the decoded HDTV image signal from MPEG decoder 113 and the decoded QVGA image signal from MPEG decoder 133 based upon receiver status signal 114. If receiver status signal 114 indicates that the HDTV receiver status is good, then multiplexer 120 selects the HDTV image signal. If receiver status signal 114 indicates that the HDTV receiver status is bad, then multiplexer 120 selects the QVGA image signal. The signal selected by multiplexer 120 supplies resize circuit 121. Resize circuit 121 resizes the received signal to an appropriate size for display 122. Note the impute image may be a HDTV image or a QVGA image according to the selection of multiplexer 120. In the preferred embodiment the resized signal is a VGA signal (800 horizontal dots in 480 lines) and display 122 is a VGA display.

This system requires two pairs of tuner/decoder pairs of circuits. These are: first pair tuner 112 and MPEG decoder 113; and second pair tuner 133 and MPEG decoder 133. Each tuner/decoder pair work concurrently and continuously during period when the DTV decoder system is activated. This is required even though only one pair is selected by multiplexer 120 to produce the displayed image and other pair is not used. Employing two such tuner/MPEG decoder pairs consumes a disadvantageous amount of electric power and makes the decoder system large.

SUMMARY OF THE INVENTION

This invention shares a single reference frame buffer between the HDTV tuner and the QVGA tuner. Thus this invention employs two tuners and a single MPEG decoder. The single MPEG decoder switches between the HDTV and the QVGA source bitstreams. The two bitstreams are based on same image data while differing in other ways such as image size. Because the two bitstreams include the same image data sharing reference frame buffers for the two bitstreams is possible. This invention reduce memory area required for the reference frames and displayed pictures and eliminates that need for one MPEG decoder.

BRIEF DESCRIPTION OF THE DRAWINGS

These and other aspects of this invention are illustrated in the drawings, in which.

DETAILED DESCRIPTION OF PREFERRED EMBODIMENTS

This invention is a DTV decoder system including two tuners, one for 12-segment HDTV broadcast and one is 1-segment QVGA broadcast, and a shared MPEG decoder.

Figure 1:
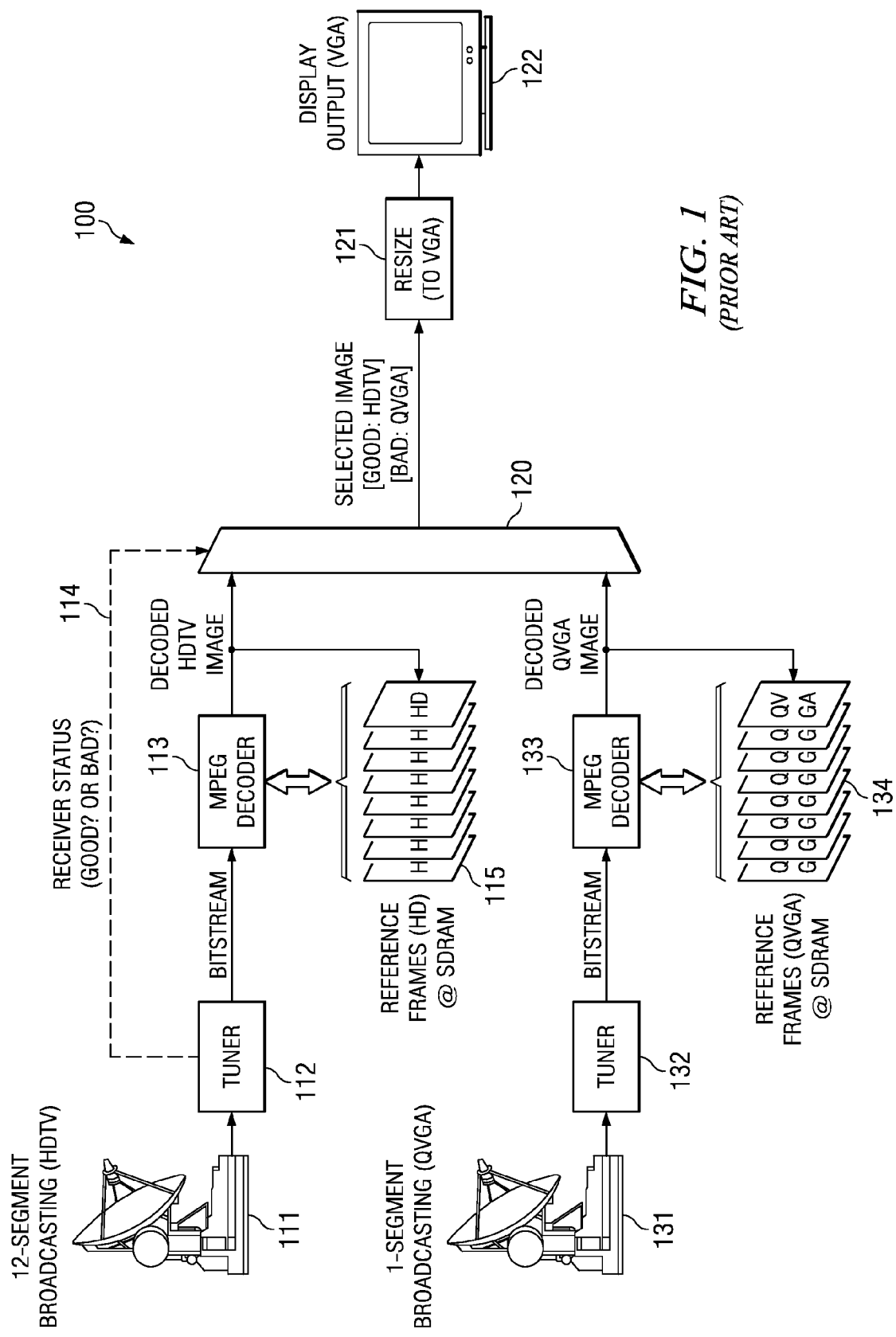
FIG. 1 illustrates a block diagram of a prior art digital television receiver including two tuners and two MPEG decoders.
Figure 2:
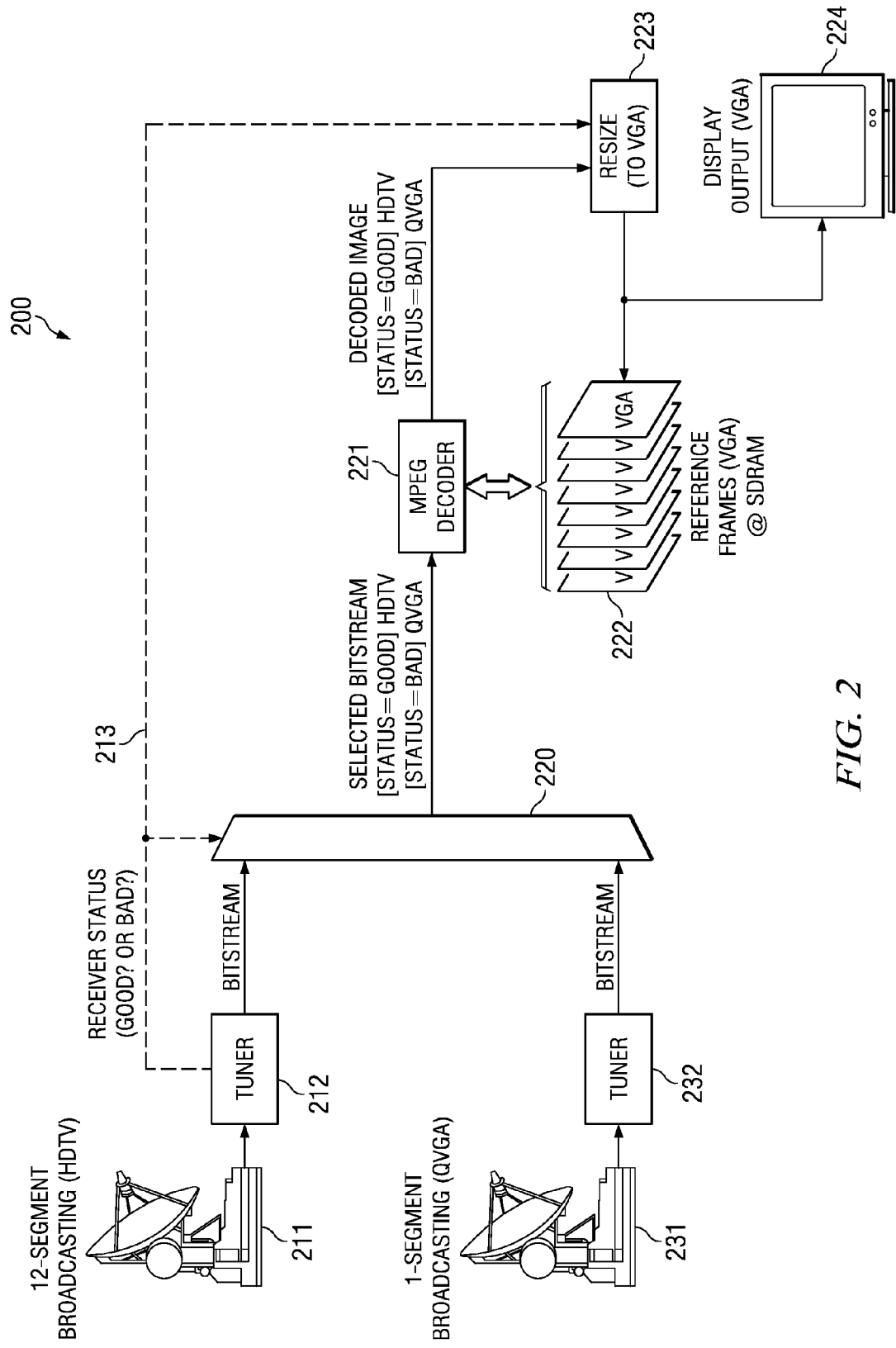
FIG. 2 illustrates a block diagram of this invention including two tuners and a shared MPEG decoder.

FIG. 2 illustrates a block diagram of system 200 according to this invention. First antenna 21 receives the 12-segment HDTV broadcast and supplies the received signal to tuner 212. Tuner 112 detects the HDTV broadcast signal and supplies a bitstream to one input of multiplexer 220. Tuner 212 also produces a receiver status signal 213. Receiver status signal 213 is similar to receiver status signal 114 illustrated in FIG. 1. Receiver status signal 213 is a digital signal indicating the receiver status as good or bad.

Second antenna 231 receives the 1-segment QVGA broadcast and supplies the received signal to tuner 232. Tuner 132 detects the QVGA broadcast signal and supplies a bitstream to a second input of multiplexer 232.

Multiplexer 220 selects between the HDTV bitstream from tuner 212 and the QVGA bitstream from tuner 232 based upon receiver status signal 213. If receiver status signal 213 indicates that the HDTV receiver status is good, then multiplexer 220 selects the HDTV bitstream. If receiver status signal 213 indicates that the HDTV receiver status is bad, then multiplexer 220 selects the QVGA bitstream. The signal selected by multiplexer 220 is supplied to MPEG decoder 221. MPEG decoder 221 employs a number of frame buffers 222. These are preferably stored in synchronous dynamic random access memory (SDRAM). The decoded image output of MPEG decoder 222 supplies resize circuit 224. Resize circuit 224 resizes the decoded images received from multiplexer 220 for display on display 224. In the preferred embodiment display 224 is a VGA display and resize circuit 223 converts the decoded images to a VGA signal. Note that the output of MPEG decoder 221 may be either an HDTV image or a QVGA image depending upon the selection of multiplexer 220. FIG. 2 illustrates a connection from the decoded image output of MPEG decoder 221 to frame buffers 222. This provides a path for decoded and resized images to be stored in frame buffers 222. MPEG decoder 221 uses the image data stored in frame buffers 222 in decoding. Note that frame buffers 222 store resized VGA images.

The images stored in frame buffers 222 are of VGA size the same as displayed by display 224. In system 200 multiplexer 220 is placed between two separate tuners (212 and 232) and MPEG decoder 221. The bitstream selected by multiplexer 220 becomes the source data for MPEG decoder 221. Information, such as the receiver status signal 213, indicating the selected bitstream (HDTV or QVGA) is sent resize circuit 223. This enables resize circuit 223 to change decoded images into display image size by converting HDTV to VGA or converting QVGA to VGA depending on the receiver status signal 213.

Figure 3:
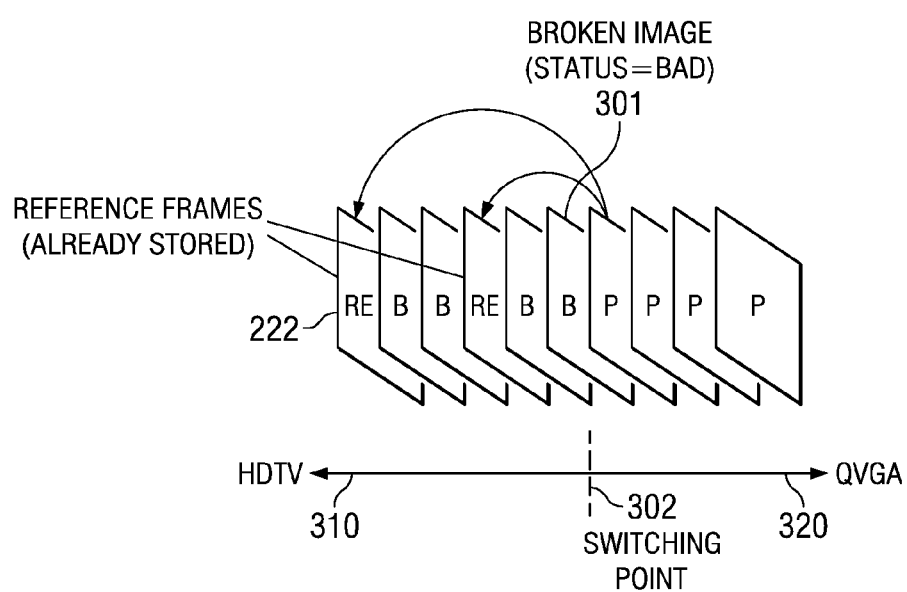
FIG. 3 illustrates an example of pictures stored in the plural frame buffers upon a switch of input formats.

System 200 can accomplish near seamless decoding of a digital television (DTV) broadcast by storing VGA images as reference pictures in frame buffers 222. FIG. 3 illustrates an example of seamless switching between HDTV images and QVGA images. FIG. 3 illustrates frame buffers 222. Frame buffers 310 within frame buffers 222 are VGA images from HDTV sourced images. Later frame buffers 320 are VGA imaged from QVGA sources images. In this example the image 301 corresponds to the first bad or broken HDTV source image. A bad receiver status signal 213 at this point causes a switching point 302 between HDTV tuner 212 and QVGA tuner 232 via multiplexer 220. System 200 can accomplish seamless decoding of DTV broadcasting even if the system switches source bitstream from HDTV to QVGA or from QVGA to HDTV. Reference pictures used for both HDTV decoding and QVGA decoding are stored as VGA pictures. These VGA reference pictures and are always available in reference buffers 222 regardless of the size of the original images. Thus decoding can proceed across a source switch boundary by sharing the reference pictures in the resized VGA form.

This invention removes the need for independent MPEG decoders for each source of bitstream in DTV decoder system by sharing reference pictures among both the HDTV source and the QVGA source. This reuses the resize circuit used to drive the small display in a mobile platform. This invention: reduces electrical power consumption; and reduces the size and cost of the decoder system by sharing reference and display images. This invention makes a low cost DTV decoder system for a movable platform more feasible.

What is claimed is:

1. A digital television receiving system receiving alternative broadcasts comprising:
    a first tuner having an input receiving a broadcast signal and an output, said first tuner converting a broadcast signal of a first type into a corresponding first type bitstream;
    a second tuner having an input receiving a broadcast signal and an output, said second tuner converting a broadcast signal of a second type into a corresponding second type bitstream;
    a multiplexer having a first input connected to said output of said first tuner, a second input connected to said output of said second tuner and an output, said multiplexer outputting a selected one of said first input and said second input;
    an image decoder having an input connected to said output of said multiplexer and an output, said image decoder decoding a bitstream received on said input into a sequence of decoded images at said output;
    a resize circuit having an input connected to said output of said image decoder and an output, said resize circuit converting said sequence of decoded images of said image decoder to a sequence of images having a fixed size of a corresponding display;
    a plurality of frame buffers connected to said resize circuit, each frame buffer storing a corresponding reference frame image of said fixed size from said resize circuit; and
    wherein said image decoder is further connected to said plurality of frame buffers, said image decoder decoding said received bitstream in response to said reference frame images stored in said plurality of frame buffers.

2. The digital television receiving system of claim 1, wherein:
    said first tuner further generates a receiver status signal indicating whether said broadcast signal of said first type is good or bad; and
    said multiplexer further includes a control input receiving said receiver status signal, said multiplexer outputting said first input if said receiver status signal indicates said broadcast signal of said first type is good and outputting said second input if said receiver status signal indicates said broadcast signal of said first type is bad.

3. The digital television receiving system of claim 2, wherein:
    said broadcast signal of said first type has a first image size and said broadcast signal of said second type has a second image size different from said first image size; and
    said resize circuit includes a size input receiving said receiver status signal, said resize circuit converting said sequence of decoded images of said image decoder from said first size to said a fixed size if said receiver status signal indicates said broadcast signal of said first type is good and converting said sequence of decoded images of said image decoder from said second size to said a fixed size if said receiver status signal indicates said broadcast signal of said first type is bad.

4. The digital television receiving system of claim 1, wherein:
said broadcast signal of said first type is an 12-segment HDTV signal.

5. The digital television receiving system of claim 1, wherein:
said broadcast signal of said second type is a 1-segment QVGA signal.

6. The digital television receiving system of claim 1, wherein:
said fixed size of said resize circuit is a VGA signal.

* * * * *